United States Patent Office 3,164,564
Patented Jan. 5, 1965

3,164,564
UNSATURATED LINEAR POLYCARBONATE
Richard Butterworth, Manor Township, Lancaster County, and John A. Parker, Lancaster Township, Lancaster County, Pa., assignors to Armstrong Cork Company, Lancaster, Pa., a corporation of Pennsylvania
No Drawing. Filed Apr. 21, 1961, Ser. No. 104,532
8 Claims. (Cl. 260—47)

This invention relates to linear polycarbonates, and more particularly to linear polycarbonates having terminal hydroxyl groups. Still more particularly, the invention relates to linear polycarbonates possessing allyl groups recurring along the linear chain.

Various bis-phenols and phosgene have been used as the starting materials for polycarbonates in the past. However, no prior polycarbonates possessed a usable double bond, olefinic unsaturation, distributed along the polycarbonate chain. Olefinic unsaturation is useful for cross-linking to an insoluble state the linear polycarbonate which itself may have a molecular weight in the range of about 10,000–500,000.

The present invention contemplates forming a linear polycarbonate possessing terminal hydroxyl groups by reacting phosgene at a temperature in the range of 18°–22° C. with a bis (phenol) allyl alkanoic acid ester.

The bis (phenol) allyl alkanoic acid ester which forms the starting material of the process of the present invention possesses the formula

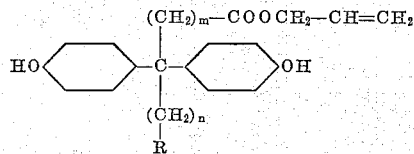

wherein R is hydrogen or a methyl group, $m$ is a number from 0 to 7, and $n$ is a number from 0 to 7, such that $m+n$ is equal to or less than 7. The total number of carbon atoms in the alkanoic acid group exclusive of the ester group which links the two phenol groups will thus be in the range of 2 to 9 carbon atoms, but preferably 5.

The allyl ester may be made by reacting allyl alcohol with a bis-(4-hydroxyl phenyl) alkanoic acid, preferably in the presence of an acidic inert medium such as acidified benzene. Water of esterification will be removed by heating. The allyl ester may be recovered by working up the ester from the solvent medium. Preferably the ester is crystallized from water after standing for several days.

The reaction between phosgene and the above-described bis-phenolic acid ester is preferably carried out in a solvent or a solvent system. Solvents which are relatively inert to the reactants such as acetone, ether, benzene, or the like, may be employed as the reaction medium. Although a solvent is not essential, use of a solvent or solvent system greatly improves the handleability of the entire reaction. It has been found that the reaction between the phosgene and the bis-phenolic acid ester is greatly accelerated by the use of a strong base to aid in the elimination of hydrogen chloride from the reactants. Although bases such as sodium hydroxide and potassium hydroxide can be used, it s preferred that organic material such as pyridine, quinoline, and the like be used.

The phosgene and the bis-phenolic acid ester will be used in equimolar amounts. The bis-phenolic acid ester is preferably taken up in the solvent and the phosgene bubbled through the solution in the form of a gas. By metering the amount of phosgene admitted to the solution, it is possible to determine when sufficient phosgene has been admitted to the solution on a mole-for-mole basis. No harm is done if a molar excess of phosgene is used, but an excess of the acid ester will reduce the molecular weight due to incomplete reaction.

The temperature of the reaction must be in the range of minus 10° to 38° C., and preferably in the range of 18° to 22° C. Since the reaction is exothermic the problem generally encountered will be to keep the temperature down. This is accomplished by the usual cooling water or cooling liquids to withdraw heat from the reaction mixture.

On completion of the reaction the linear polycarbonate should be recovered from the solvent or solvent system. Any hydrochloric acid salts can be removed from the reaction mixture by filtering. Water or petroleum either can then be used to precipitate the polymer from the solvent; the polymer is in the form of a flock. The molecular weight will be in the range 10,000–500,000, with higher molecular weight polycarbonates being produced at higher temperatures within the above-specified range. The polycarbonate is soluble in such solvents as the esters, for example ethyl acetate, butyl acetate, and butyl Cellosolve acetate. Polycarbonates made from the prior straight bis-phenols are not soluble in these solvents. All the polycarbonates are soluble in tetrahydrofuran, dimethly formamide and chloroform.

A solvent solution of the linear polycarbonate can be used to deposit a film of the polycarbonate on such surfaces as desk tops, wall covering, floor coverings, and the like. This film is tough, strong and flexible, and will show no whitening or other indications of crystallization on pronounced distortion. Even pronounced stretching produces no crystallization. The linear polycarbonate of the present invention may thus be utilized as the resin in injection molding, with or without fillers. The structural formula of the linear polycarbonate possessing terminal hydroxyl groups is as follows:

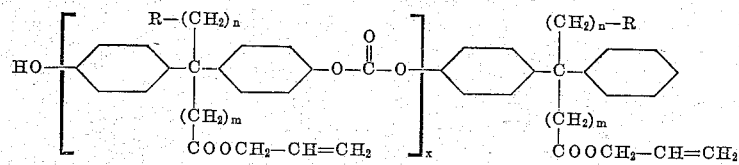

where $x$ is a number between 30 and 1,000, R is hydrogen or a methyl group, $n$ is a number from 0 to 7, and $m$ is a number from 0 to 7 such that $m+n \leq 7$.

The above-described linear polycarbonate resins possessing terminal hydroxyl groups may be modified by utilizing as a starting mixture the above-described allyl bis-phenolic acid ester admixed with a bis-phenol having the general formula HO—Ar—A—Ar—OH wherein Ar represents arylene and A represents a saturated bivalent aliphatic hydrocarbon radical such as an alkylidene or an alkylene radical containing 1–7 carbon atoms. These bis-phenols have been reacted with phosgene in the past to produce polycarbonates, but they have never been used as modifying agents in combination with the above-described allyl bis-phenolic acid ester to produce useful polycarbonates. The bis-phenol to be admixed with the bis-phenolic acid ester can be thought of as a comonomer of the bis-phenolic acid ester.

The amount of the bis-phenol to be admixed with the bis-phenolic acid ester to produce the modified polycarbonates of the present invention should be in the range of about 0–95 mole percent of the bis-phenol. To state it another way, the bis-phenolic acid ester must always be present at least in an amount of 5 mole percent of the mixture of phenols. The amount of bis-phenol may thus vary from 95 mole percent on down to zero mole percent wherein a polycarbonate is produced solely from the bis-phenolic acid ester as described earlier.

Preparation of the polycarbonates from the mixture of bis-phenols will be as described earlier for the use of diphenolic acid ester alone.

Linear polycarbonates prepared using the mixture of bis-phenols will possess a structure in which the bis-phenolic acid ester moiety is interrupted by the bis-phenol moiety to the extent that the bis-phenol is utilized in the starting reaction mixture. The final products are isolated in the usual fashion from the reaction mixture as fine, white powders soluble in such solvents as tetrahydrofuran, dimethylformamide, and methylene chloride.

An interesting feature of these polycarbonates is their ability to cure on the application of heat. The fusible copolymers as prepared may be converted to insoluble and infusible resins possessing excellent heat stability by heating for periods which may vary from 6 hours at 150° C. to 1 hour at 200° C. These self-vulcanizing copolymers from bis-phenolic acid esters and bis-phenols are particularly well suited for certain kinds of flooring binder applications wherein the copolymers serve as binders for fillers, the entire composition being rendered into sheet form and cured by the application of heat.

The curing process apparently proceeds with elimination of the alcohol corresponding to the alcohol used to form the bis-phenolic acid ester. If the fusible copolymers are rapidly heated in sufficiently thick sections with a sufficiently high concentration of bis-phenolic acid ester present in the copolymer (for example 50 mole percent or more), and if the alcohol released is volatile, a foamed or cellular structure will thereby be formed yielding a rigid, high temperature resistant foam structure having closed cells.

The straight polymer made of the allyl alkanoic acid ester itself may be taken up in a methyl methacrylate monomer, a suitable peroxide catalyst added, and the mixture polymerized by warming to a temperature in the range of 30°–80° C. The unsaturation in the methyl methacrylate monomer adds to the unsaturation in the allyl group in the polycarbonate polymer to form mixed polymer completely insoluble in such polycarbonate solvents as methylene chloride.

Additionally, the polymer may be addition polymerized with itself or with other unsaturated materials, preferably those which exist in liquid form under conditions approximating atmospheric pressure and room temperatures. Suitable catalysts are bis-(2,4-dichloro benzoyl) peroxide, lauroyl peroxide, benzoyl peroxide (actually dibenzoyl peroxide), bis-p-chloro benzoyl peroxide, cumene hydroperoxide, t-butyl perbenzoate, isopropyl percarbonate, capryloyl peroxide, acetyl peroxide, and any of the peroxide catalysts used as an aid for addition polymerization. Ultraviolet light will aid polymerization through the allyl group of the polycarbonates of the present invention without the need for peroxide catalysts. Polymerization may also be accomplished through the allyl group by means of heat alone.

Films formed from the polycarbonate of the present invention serve as excellent adhesive films, since the allyl-group-containing polycarbonate of the present invention is the only polycarbonate so far known which readily adheres to a wide variety of substrates when heated in contact therewith.

The following examples illustrate several embodiments of the invention. All parts are by weight unless otherwise stated.

*Example 1*

To a 3-liter, 3-necked flask fitted with a thermometer, reflux condenser, Dean-Stark trap (for water removal), and stirrer were added: 660 parts 4,4-bis-(4-hydroxy phenyl) pentanoic acid, 700 parts allyl alcohol, 660 parts benzene, and a catalyst composed of 39 parts fuller's earth mixed thoroughly with 12 parts sulfuric acid. The flask was heated for 1½ hours. The water formed was removed continually by the Dean-Stark trap. The mixture in the flask was then filtered and cooled.

Acetone was added. The solution of the allyl ester was washed twice with 2% sodium bicarbonate solution and twice with pure water. The product was boiled with xylene until no further temperature change at the boiling point was noted, whereupon the solution was cooled. Excess xylene was poured off and the boiling procedure with xylene was repeated twice. The resulting thick syrup was poured into water. The allyl ester crystallized on standing for several days. The tan allyl ester had a melting point of 88°–89° C.

*Example 2*

Twenty-nine parts of allyl 4,4-bis-(4-hydroxy phenyl) pentanoic acid was dissolved in 250 parts pyridine and 325 parts methylene chloride in a 1-liter, 3-necked flask equipped with stirrer, gas inlet-outlet tubes, and thermometer. The flask temperature was maintained at 20° C. by cooling in an ice bath while 9.5 parts of phosgene was bubbled through the solution.

The mixture was poured onto ice and hydrochloric acid was added with stirring until the entire mixture was acid. The solution of the polycarbonate was washed 3 times with an equal volume of water whereupon the polycarbonate was precipitated as a solid by the addition of petroleum ether.

The resulting resin had an intrinsic viscosity of 0.47. Films cast from a methylene chloride solution of the resin were clear, tough and flexible. The films possessed a tensile strength of 6500 pounds per square inch.

Cast films were placed on a printed carboard backing and were adhered to the backing by being placed in an oven at 110° C. for 5 minutes. The material adhered strongly ot the backing and provided a protective covering thereon, and was suitable for use as a floor mat.

Additional cast films on glass were placed in the 110° C. oven for 5 minutes whereupon it was found that the cast fused films could not be removed from the glass without destroying the strong, tough film. When similar films were cast from polycarbonates wherein the ester group was a straight alkyl group rather than an allyl group, the resulting polycarbonate film did not adhere to the glass.

Cast films were also fused on paper in the same manner as described above. These films could not be peeled from the paper; the paper fibers tore from the paper and the paper delaminated. Similar films made from polycarbonates possessing an alkyl group instead of an allyl group lifted readily from the paper.

*Example 3*

Into a 2-liter, 3-necked flask fitted with stirrer, thermometer, and gas inlet-outlet tubes were placed 38 parts 2,2-bis-(4-hydroxy phenyl) propane and 55 parts of allyl 4,4-bis-(4-hydroxy phenyl) pentanoic acid dissolved in 250 parts pyridine and 975 parts methylene chloride. Over a period of 48 minutes 57 parts of phosgene was added holding the temperature at about 20° C. by means of an ice bath. The resin was recovered as a solid by the recovery procedure described in Example 2, and had an intrinsic viscosity of 0.84.

Films cast from a methylene chlordie solution of the resin were clear, tough and flexible.

Example 4

One part of the polycarbonate of allyl 4,4-bis-(4-hydroxy phenyl) pentanoic acid prepared as described in Example 2 was dissolved in 15 parts methyl methacrylate along with 0.015 part benzoyl peroxide. The mixture was maintained at 55° C. for 2 days. At the end of 2 days a hard, tough, transparent polymer resulted which was only partially soluble in methylene chloride.

We claim:

1. The method of forming a linear polycarbonate comprising reacting phosgene at a temperature in the range of minus 10° to 35° C. with an allyl bis-phenolic acid ester of the formula

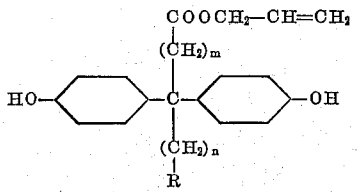

wherein R is selected from the group consisting of hydrogen and a methyl group, $n$ and $m$ are numbers from 0 to 7, such that $m+n \leq 7$.

2. The method according to claim 1 wherein said ester comprises allyl 4,4-bis-(4-hydroxy phenyl) pentanoic acid.

3. The method according to claim 1 wherein the molecular weight of said polycarbonate is in the range of 20,000–500,000.

4. The method of forming a linear polycarbonate comprising reacting phosgene at a temperature in the range of a minus 10° to 35° C. with a mixture of bis-phenols containing at least 5 mole percent of an allyl bis (phenol) alkanoic acid ester, the balance being a bis-(4-hydroxy phenyl) alkane.

5. This method of forming resin-containing recurrent linear polycarbonate groups which comprises dissolving a resin formed by the process of claim 1 in a monomeric, olefinically-unsaturated, polymerizable compound, and copolymerzing said compound with said dissolved polycarbonate.

6. A linear polycarbonate having the formula

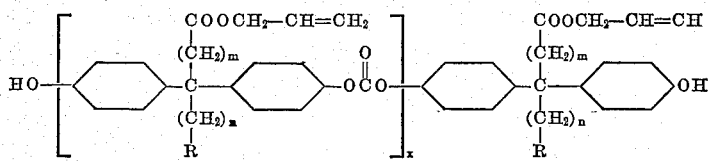

wherein R is selected from the group consisting of hydrogen and a methyl group, $m$ and $n$ are numbers from 0 to 7, such that $m+n \leq 7$, and $x$ is a number between 30 and 1,000.

7. A polycarbonate according to claim 6 wherein said alkanoic acid group contains 5 carbon atoms exclusive of the ester group.

8. A polycarbonate according to claim 6 copolymerized with an olefinically-unsaturated monomer having no more than 5 carbon atoms and a single olefinic bond.

References Cited in the file of this patent

UNITED STATES PATENTS 2,950,266    Goldblum _____ Aug. 23, 1960

FOREIGN PATENTS 589,912    Canada _____ Dec. 29, 1959